US00RE38263E

(19) United States
(12) Reissued Patent
Remerowski

(10) Patent Number: US RE38,263 E
(45) Date of Reissued Patent: Oct. 7, 2003

(54) STUD WELDING COLLET

(76) Inventor: David L. Remerowski, 8173 Fontaine Ct., Cincinnati, OH (US) 45236

(21) Appl. No.: 09/574,947

(22) Filed: May 19, 2000

Related U.S. Patent Documents

Reissue of:
(64) Patent No.: 5,753,883
Issued: May 19, 1998
Appl. No.: 08/689,181
Filed: Aug. 5, 1996

(51) Int. Cl.[7] ..... B23K 9/20
(52) U.S. Cl. ..... 219/98; 219/99
(58) Field of Search ..... 219/98, 99

(56) References Cited

U.S. PATENT DOCUMENTS

| | | | | | |
|---|---|---|---|---|---|
| 3,312,810 | A | | 4/1967 | Neumeier | 219/98 |
| 3,371,184 | A | | 2/1968 | Napoli | 219/98 |
| 3,706,870 | A | | 12/1972 | Sauder et al. | 219/98 |
| 3,910,324 | A | | 10/1975 | Nasiatka | 144/32 |
| 4,027,136 | A | * | 5/1977 | Taylor | 219/98 |
| 4,163,888 | A | * | 8/1979 | Ettinger | 219/98 |
| 4,420,674 | A | * | 12/1983 | Jordan | 219/98 |
| 4,562,329 | A | * | 12/1985 | Minton | 219/98 |
| 4,620,079 | A | | 10/1986 | Allmann et al. | 219/98 |
| 4,821,401 | A | * | 4/1989 | Williams | |
| 5,384,445 | A | | 1/1995 | Nakagami | 219/98 |
| 5,389,762 | A | * | 2/1995 | Schneegans | 219/98 |
| 5,681,061 | A | | 10/1997 | Olson | 285/322 |
| 5,688,414 | A | | 11/1997 | Kondo | 219/98 |
| 5,824,987 | A | | 10/1998 | Volk | 219/98 |
| 5,921,561 | A | | 7/1999 | Cedarberg, III | 279/50 |

FOREIGN PATENT DOCUMENTS

| | | | | | |
|---|---|---|---|---|---|
| DE | 1112221 | | * | 8/1961 | 219/98 |
| DE | 29518041 | U1 | * | 5/1996 | |
| FR | 1259217 | | * | 3/1961 | |
| GB | 668402 | | * | 3/1952 | 219/98 |
| JP | 57-17389 | | * | 1/1982 | 219/98 |
| SU | 733908 | | * | 5/1980 | 219/98 |
| WO | 92/06814 | | * | 4/1992 | |

* cited by examiner

*Primary Examiner*—Clifford C. Shaw

(57) ABSTRACT

A new adjustable collet for stud welding employs a plurality of electrically energizable jaws coordinated to firmly grasp studs of various shapes, sizes and orientations while welding them to a work surface. This adjustable collet will also ensure better contact with the stud and thus reduce the likelihood of arcing and faulty welds. Premature collet wear will also be averted by reducing the amount of sliding contact between the collet and the stud.

19 Claims, 4 Drawing Sheets

FIG 3
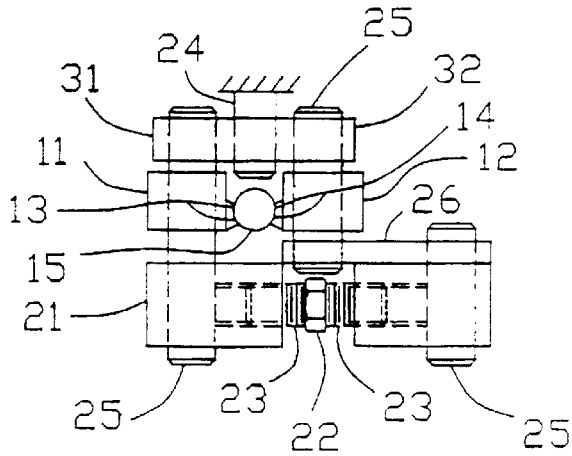
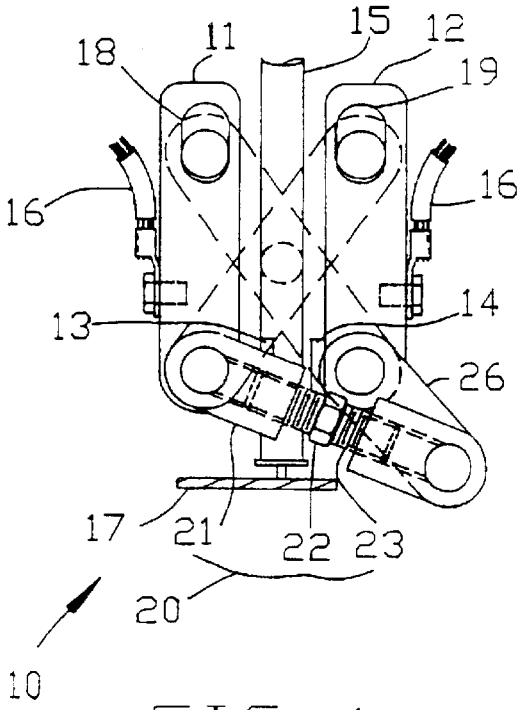
FIG 1
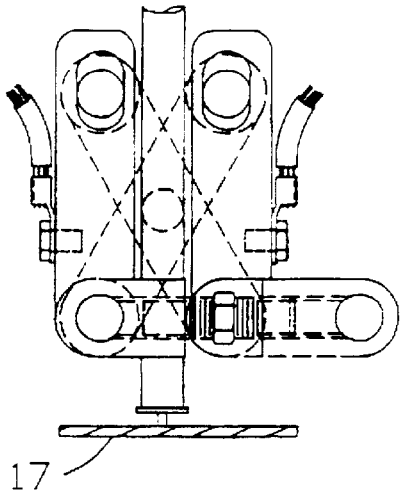
FIG 2

FIG 4
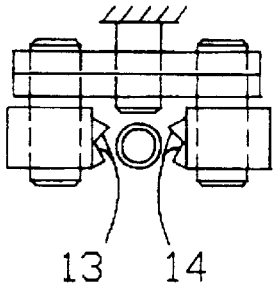
FIG 5
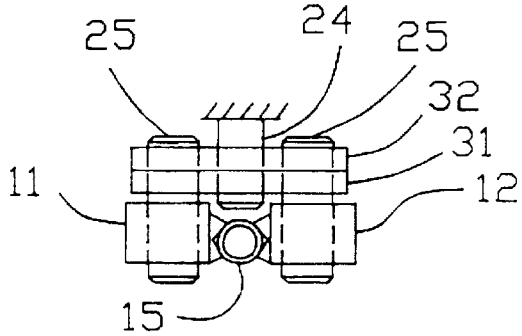
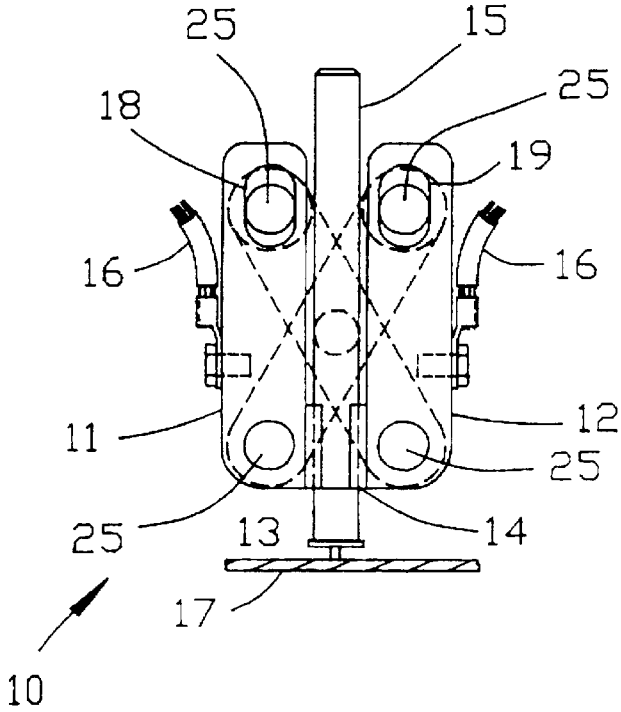
FIG 6

FIG 7
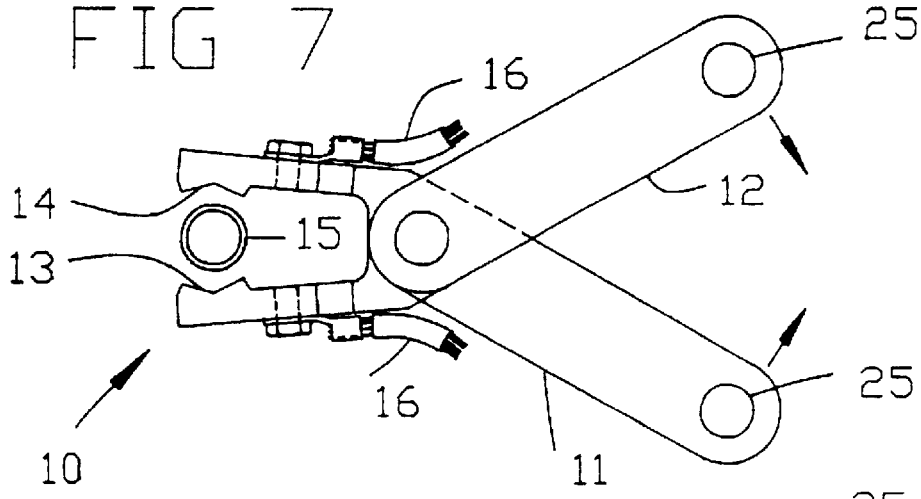
FIG 8
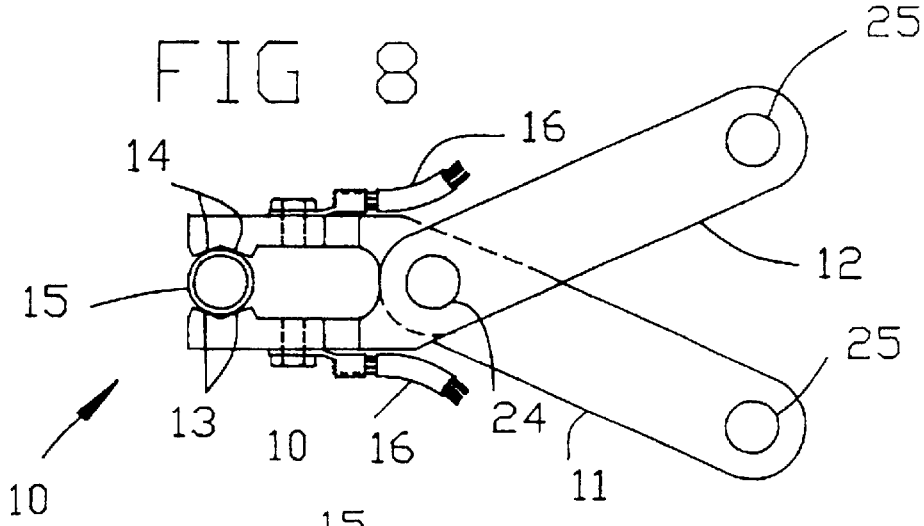
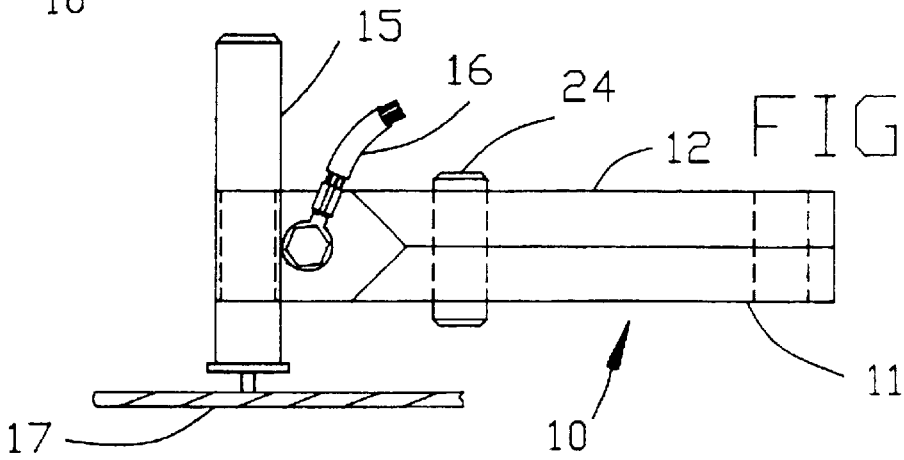
FIG 9

FIG 10
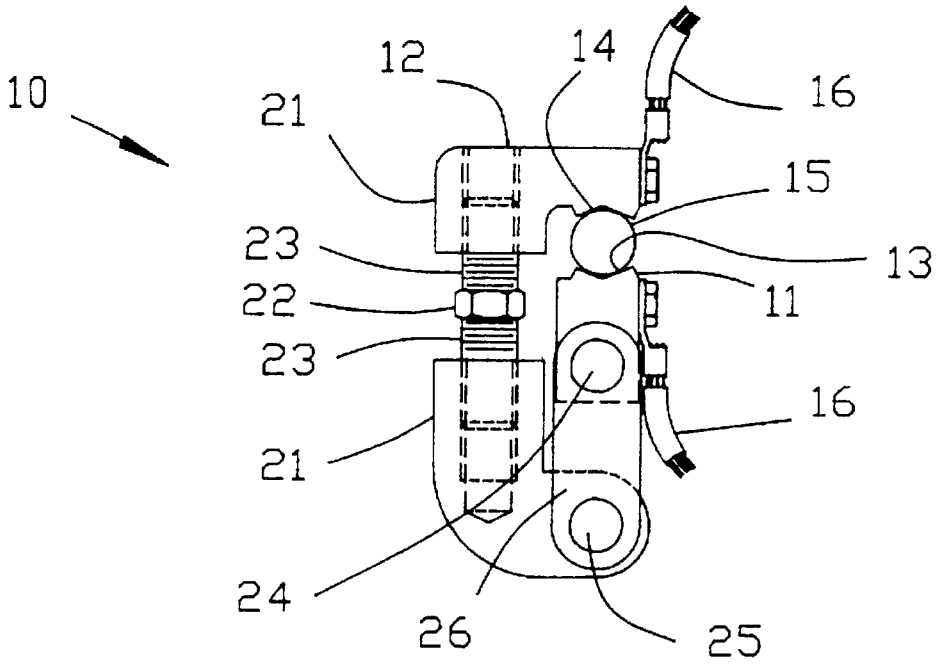
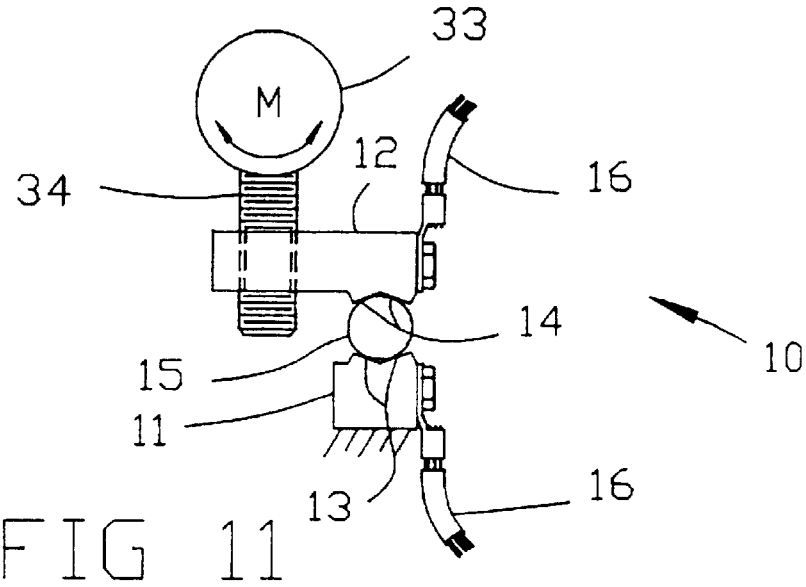
FIG 11

STUD WELDING COLLET

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to stud welding which is a form of electric arc welding. In practice, a stud, a type of metal fastening device, is loaded into an electrically energizable collet, which is usually situated in the barrel of a stud welding tool (gun), grasped and positioned over an area of attachment, more commonly referred to as a work piece or a work area. When the tool is energized, an arc is created between the distal end of the stud and the area of attachment on the metal work piece. The arc melts the distal tip of the stud and the attachment site on the work piece. A timing device in the tool determines the duration of the arc and, when completed, the tool plunges the stud into the molten pool at the area of attachment creating a weldment to the work piece.

There are several reasons for developing an adjustable collet. The most apparent, of course, is versatility. The welder should be able to select and use any reasonably sized or shaped stud to effect optimal fastening. The size and accessibility of the stud should not be dictated by the size or maneuverability of the collet. Therefore, a collet that can be opened and adjusted to access and accommodate a variety of different sized and shaped studs would provide a definite work place advantage.

Furthermore, with the traditional cylinder-shaped collet providing a "finger-fit" for a stud of a particular shape and size, it is not uncommon for premature wear and arcing to combine to shorten the useful life of the collet and, over time, as the collet deteriorates, to deliver welds of diminished quality. With a fixed collet there is, understandably, more wear on the collet simply as a result of the abrasive movement of the stud into the collet and the withdrawal of the collet from the welded stud. This repetitive movement will abrade the inner surface of the traditional fixed collet, weaken any tensioning means for holding the stud and result in a loose fit and, over time, permit little more than haphazard contact between the collet and the stud. Anything less than a snug fit ensuring secure contact between the collet and the stud will increase the likelihood of peripheral arcing and jeopardize the intensity and quality of the arc to be created between the distal tip of the stud and the work surface. This peripheral arcing, in time, also causes more wear, thus more arcing; and, before long, the useful life of the traditional collet is finished and a replacement needs to be installed.

Most collet manufacturers haven't been highly motivated to address the problem of fixed-collet deterioration. However, some patent references have made suggestions for prolonging collet life and increasing versatility.

2. Description of the Prior Art

Generally, a collet for the attachment of studs to a work piece is a tubular electrode, used in combination with a stud welding gun designed to hold weld studs in proximity to the area of attachment prior to welding. Traditionally, these tubular electrodes are heavy-walled and machined to provide a plurality of close-tolerance "fingers" at the end of the collet for gripping the stud and providing a modicum of flexiblity.

U.S. Pat. No. 4,027,136 to Taylor describes an automatic welding device with what is alleged to be an improved collet design that is relatively easy and inexpensive to manufacture. It features slots and flexible "fingers" for gripping the stud and a reduced frontal surface area to minimize the collection of splatter material from the welding process, and thereby diminish the likelihood of undesirable arcing.

U.S. Pat. No. 4,163,888 to Ettinger describes an arc welding device with a stud gripping collet. The lower end of this collet has a plurality of spring-like "fingers" which receive and grip the stud while the upper end of the collet is provided with internal threads for receiving an adjustment screw which may be moved in or out of the collet to adjust the length of that portion of the stud extending from the collet so that studs having various lengths can be used in the described device.

SUMMARY OF THE INVENTION

The instantly disclosed adjustable collet is distinguished from and improves upon the devices of the prior art by providing an adjustable collet designed to be used for welding studs having a variety of shapes and dimensions and presented in orientations that may or may not complicate attachment to the work piece. The adjustable collet comprises a plurality of electrically energized jaws, each having at least one surface for contacting the stud to be welded, and an adjusting means, in association with the jaws, for opening and closing the jaws and holding the stud between each of the contacting surfaces.

BRIEF DESCRIPTION OF THE DRAWINGS

FIG. 1 is a side view of an adjustable collet and locking mechanism with the jaws in an open position.

FIG. 2 is a side view of an adjustable collet and locking mechanism with the jaws locked on a stud.

FIG. 3 is a top view of FIG. 2.

FIG. 4 is a top view of an adjustable collet with the jaws in an open position.

FIG. 5 is a top view of an adjustable collet with the jaws in a closed position.

FIG. 6 is a side view of FIG. 5.

FIG. 7 is a top view of an adjustable collet with open jaws having a "scissors-action" adjusting means.

FIG. 8 is a top view of an adjustable collet with closed jaws having a "scissors-action" adjusting means.

FIG. 9 is a side view of FIGS. 7 & 8.

FIG. 10 is a top view of an adjustable collet with a turnbuckle and toggle adjusting means.

FIG. 11 is a top view of an adjustable collet with a motor-powered adjusting means.

DESCRIPTION OF THE PREFERRED EMBODIMENTS

The adjustable collet described herein can best be appreciated and described by reference to the drawings. FIG. 1 depicts an adjustable collet 10 in proximity to a stud 15 to be welded to a work piece 17. The collet is in an open position and no contact is being made with the stud. The collet includes a pair of jaws 11 & 12 positioned in parallel to each other and the stud. Each jaw is energizable by an electric lead 16 and features a contact surface 13 & 14 for attaching to the stud. The lead, in most instances, will be designed to carry high amperage electrical current to the jaws, which will, in turn, electrify the stud at the contact surfaces and ultimately effect welding the tip of the stud to the work piece. All welding studs, regardless of material, composition, style or size are welded with DC power sources. Power requirements vary in proportion to the square of the stud diameter; length of the fastener has no appreciable effect.

To stabilize the grasp and maximize the quality of the weld, the jaws should be positioned at equal distances on the perimeter of the stud. For instance, if the collet has a pair of jaws, they should be positioned diametrically.

To facilitate opening and closing the jaws to detach and reattach the contact surfaces to the studs, each jaw is connected to a pair of links 31 & 32, thus making the jaws and, therefore, the collet adjustable. The links are attached to each other by a fixed pin 24 through the middle of each link, and each link is diagonally attached to each jaw by pivot pins 25. To enable the jaws to grasp and release the stud, it is necessary, in this embodiment, for two of the jaw and link connections to be somewhat less than fixed. This can be accomplished by the slots 18 & 19 in the jaws which, in this instance, permit two of the pinned links to reposition themselves as the jaws are opened and closed about the stud.

To temporarily secure the jaws 11 & 12 and their contact surfaces 13 & 14 to the surface of the stud 15, a turnbuckle link 20 and link 26 can be affixed to the adjusting means. In operation, a small amount of force placed on the knee linking the link with an adjustable link 20 will bring the adjustable links 21 into alignment with the link 26 to hold the jaws and their contact surfaces into a locking relationship with the stud. The locking relationship can be discontinued and the jaws opened by moving the turnbuckle 20 and the link 26 out of alignment.

The turnbuckle can be adjusted, of course, to accommodate studs of varying diameters. The adjustment to the turnbuckle is made by rotating the adjustment hex 22, which is affixed to the threaded bolt 23. The bolt is threaded with right and left hand threads which, when turned by the adjustment hex 22, will draw the adjustable links 21 closer together or drive them farther apart.

Other embodiments of the adjustable collet are depicted in FIGS. 7–11. In one of these embodiments, the jaws are articulated to open and close in a "scissors-action" by a pair of pivoting links. Once closed, these links could be secured to hold the jaws in a locking relationship on the stud by way of a variety of mechanisms. Other locking arrangements that could be employed to hold the adjustment means in a fixed or locked relationship, thus enabling the jaw to maintain a secure grasp on the stud, include biasing means, levers, cams and tapered locks. In FIG. 10, the adjustment means and locking mechanism are combined such that turning the hex 22 will open and close the jaws; and, with additional turning (tightening), effectively lock the closed jaws on the stud. FIG. 11 also illustrates a combined adjusting and locking mechanism further enhanced by including a motor means for closing and holding the jaws in a secure relationship with the stud.

While the foregoing is a complete and detailed description of preferred embodiments of the disclosed device, numerous variations and modifications may also be employed to implement the purpose of the invention. And, therefore, the elaboration provided should not be assumed to limit the scope of the invention which is defined by the appended claims.

What is claimed is:

1. An adjustable collet for stud welding which comprises:

a plurality of electrically energized jaws, each jaw having a least one surface for the contacting a stud, and an adjusting means, in association with said jaws, for opening and closing said jaws and holding a stud between each of the contacting surfaces, said adjusting means further comprising means for diametrically positioning said jaws in contact with a stud and mechanically holding the contact surfaces against a stud in a positive locked relationship when said jaws are in a closed position.

2. An adjustable collet according to claim 1 having a pair of jaws.

3. An adjustable collet according to claim 1 wherein said adjustment means contains a turnbuckle link coupled to said jaws.

4. An adjustable collet according to claim 1 wherein said adjustment means contains a pair of links pivotally coupled to said jaws which permit said jaws to open and close with a scissors action.

5. An adjustable collet according to claim 1 wherein said adjustment means includes motor means for closing and holding said jaws, in a fixed relationship with a stud.

6. An adjustable collet according to claim 1 herein said adjustment means includes a threaded link coupled said jaws, said link further including a hex nut which is rotatable to open and close said jaws.

7. In combination with a stud welding device, an adjustable collet having a plurality of electrically energized jaws, each jaw having at least one surface for contacting a stud, and an adjusting means, in association with said jaws, for opening and closing said jaws and holding a stud between each of the contacting surfaces, said adjusting means further comprising means for diametrically positioning said jaws in contact with a stud and mechanically holding the contact surfaces against a stud in a locked relationship when said jaws are in a closed position.

*8. An adjustable collet for stud welding which comprises:*

*a plurality of electrically energized jaws, each jaw having at least one surface for the contacting a stud, and an adjusting mechanism, in association with said jaws, for opening and closing said jaws and holding a stud between each of the contacting surfaces,*

*said adjusting mechanism further comprising mechanism for positioning said jaws in contact with a stud and mechanically holding the contact surfaces against a stud in a locked relationship when said jaws are in a closed position, said adjusting mechanism being adjustable to accommodate studs of varying diameters by positioning said jaws closer together or farther apart for different studs.*

*9. An adjustable collet according to claim 8 wherein said jaws comprise a pair of jaws diametrically positioned around a stud.*

*10. An adjustable collet according to claim 8 wherein said adjustment mechanism comprises a turnbuckle link coupled to said jaws.*

*11. An adjustable collet according to claim 8 wherein said adjustment mechanism comprises a pair of links pivotally coupled to said jaws which permit said jaws to open and close with a scissors action.*

*12. An adjustable collet according to claim 8 wherein said adjustment mechanism comprises a threaded link coupling said jaws, said link further comprising a hex nut which is rotatable to open and close said jaws.*

*13. An adjustable collet according to claim 8 wherein said adjustment mechanism comprises a motor for positioning said jaws in a fixed relationship with a stud.*

*14. A method of stud welding, comprising*

*providing a stud welding device having an adjustable collet having a plurality of electrically energized jaws,*

*each jaw having at least one surface for contacting a stud, and an adjusting mechanism, in association with said jaws, for opening and closing said jaws and holding a stud between each of the contacting surfaces, said adjusting mechanism further comprising mechanism for positioning said jaws in contact with a stud and mechanically holding the contact surfaces against a stud, said adjusting mechanism being adjustable to accommodate studs of varying diameters by positioning said jaws closer together or farther apart for different studs,*

*providing a stud to be welded,*

*providing a motor in said adjustment mechanism for positioning said jaws in a fixed relationship with a stud,*

*adjusting said adjusting mechanism,*

*placing said stud in said jaws,*

*closing said jaws to hold said first stud, and*

*welding said stud with electrical energy delivered through said contacting surfaces.*

*15. The method of claim 14, further comprising*

*providing a second stud to be welded,*

*adjusting said adjusting mechanism,*

*placing said second stud in said jaws,*

*closing said jaws to hold said second stud, and*

*welding said second stud with electrical energy delivered through said contacting surfaces.*

*16. The method of claim 14 wherein said stud welding device is provided with a pair of jaws, and wherein said jaws are diametrically positioned around said stud.*

*17. A method of stud welding, comprising*

*providing a stud welding device having an adjustable collet having a plurality of electrically energized jaws, each jaw having at least one surface for contacting a stud, and an adjusting mechanism, in association with said jaws, for opening and closing said jaws and holding a stud between each of the contacting surfaces, said adjusting mechanism comprising a turnbuckle link coupled to said jaws for positioning said jaws in contact with a stud and mechanically holding the contact surfaces against a stud, said adjusting mechanism being adjustable to accommodate studs of varying diameters by positioning said jaws closer together or farther apart for different studs,*

*providing a stud to be welded,*

*adjusting said adjusting mechanism by rotating said turnbuckle,*

*placing said stud in said jaws,*

*closing said jaws to hold said stud, and*

*welding said stud with electrical energy delivered through said contacting surfaces.*

*18. A method of stud welding, comprising*

*providing a stud welding device having an adjustable collet having a plurality of electrically energized jaws, each jaw having at least one surface for contacting a stud, and an adjusting mechanism, in association with said jaws, for opening and closing said jaws and holding a stud between each of the contacting surfaces, said adjusting mechanism comprising a pair of links pivotally coupled to said jaws for positioning said jaws in contact with a stud and mechanically holding the contact surfaces against a stud, said adjusting mechanism being adjustable to accommodate studs of varying diameters by positioning said jaws closer together or farther apart for different studs,*

*providing a stud to be welded,*

*adjusting said adjusting mechanism,*

*placing said stud in said jaws,*

*closing said jaws to hold said stud with a scissors action, and*

*welding said stud with electrical energy delivered through said contacting surfaces.*

*19. A method of stud welding, comprising*

*providing a stud welding device having an adjustable collet having a plurality of electrically energized jaws, each jaw having at least one surface for contacting a stud and at least one jaw having threads, and an adjusting mechanism, in association with said jaws, for opening and closing said jaws and holding a stud between each of the contacting surfaces, said adjusting mechanism comprising a threaded link engaging said jaw threads, and a hex nut which is rotatable to open and close said jaws for positioning said jaws in contact with a stud and mechanically holding the contact surfaces against a stud, said adjusting mechanism being adjustable to accommodate studs of varying diameters by positioning said jaws closer together or farther apart for different studs,*

*providing a stud to be welded,*

*adjusting said adjusting mechanism by rotating said hex nut,*

*placing said stud in said jaws,*

*closing said jaws to hold said stud with a scissors action, and*

*welding said stud with electrical energy delivered through said contacting surfaces.*

* * * * *

UNITED STATES PATENT AND TRADEMARK OFFICE

CERTIFICATE OF CORRECTION

PATENT NO. : RE 38,263 E
DATED : October 7, 2003
INVENTOR(S) : David L. Remerowski It is certified that error appears in the above-identified patent and that said Letters Patent is hereby corrected as shown below:

Column 3,
Line 66, delete “a least one surface for the contacting”, insert -- at least one surface for contacting --.

Column 4,
Line 20, delete “claim 1 herein”, insert -- claim 1 wherein --.
Line 21, delete “link coupled said”, insert -- link coupling said --.
Line 36, delete “for the contacting”, insert -- for contacting --.

Signed and Sealed this

Thirtieth Day of May, 2006

JON W. DUDAS
*Director of the United States Patent and Trademark Office*